No. 611,261. Patented Sept. 27, 1898.
C. A. LANPHERE.
FLOUR PACKER.
(Application filed Apr. 8, 1897.)

(No Model.) 5 Sheets—Sheet 1.

WITNESSES:
Chas. F. Burkhardt
Henry L. Deck

INVENTOR:
C. A. Lanphere,
By Wilhelm & Bonner,
ATTORNEYS.

No. 611,261. Patented Sept. 27, 1898.
C. A. LANPHERE.
FLOUR PACKER.
(Application filed Apr. 8, 1897.)
(No Model.) 5 Sheets—Sheet 2.
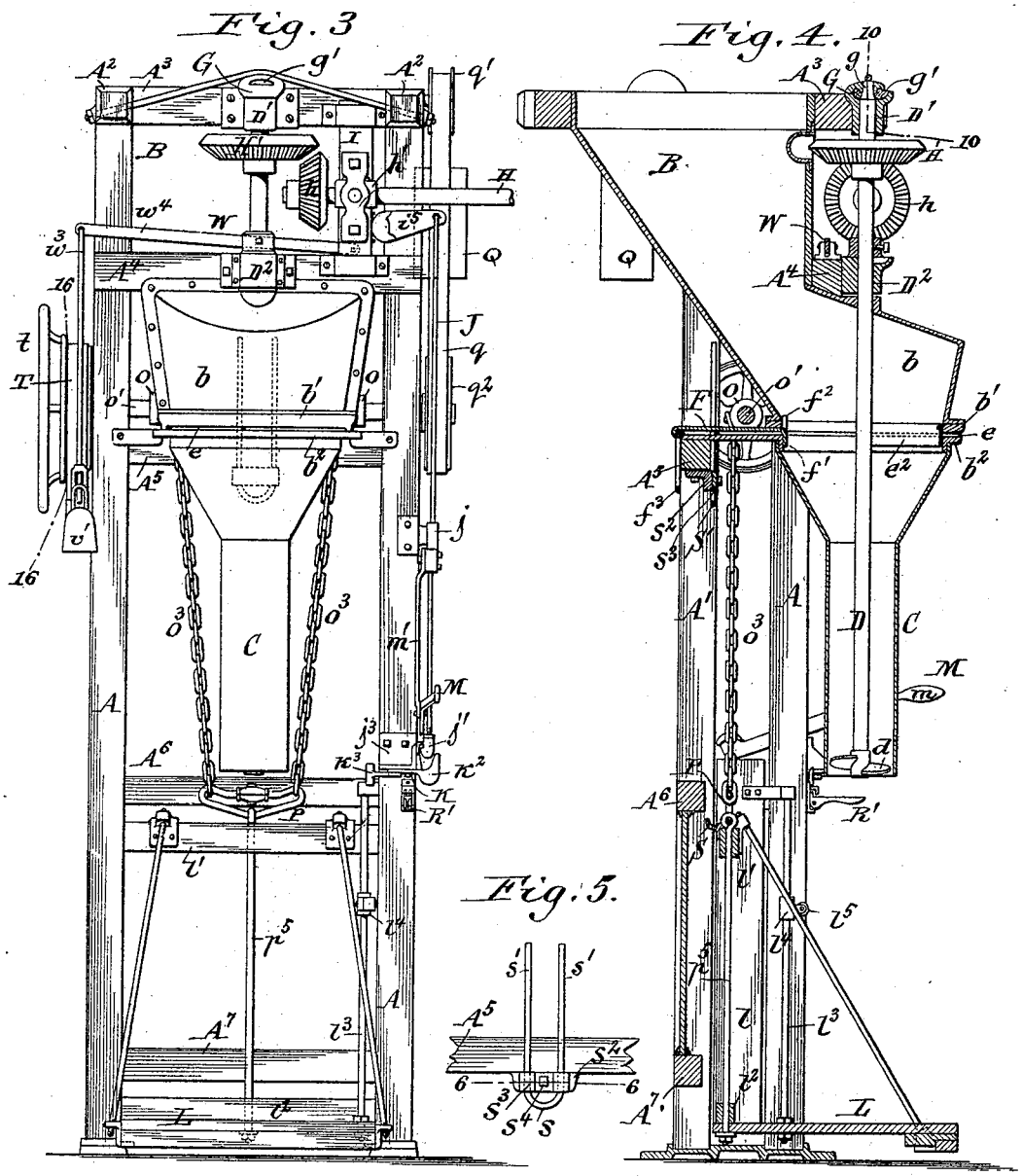
WITNESSES:
Chas. F. Burkhardt
Henry L. Deck
C. A. Lanphere, INVENTOR.
By Wilhelm & Bonner
ATTORNEYS.

No. 611,261. Patented Sept. 27, 1898.
C. A. LANPHERE.
FLOUR PACKER.
(Application filed Apr. 8, 1897.)
(No Model.) 5 Sheets—Sheet 3.

WITNESSES:
Chas. F. Burkhardt
Henry L. Deck

C. A. Lanphere, INVENTOR.
By Wilhelm & Bonner,
ATTORNEYS.

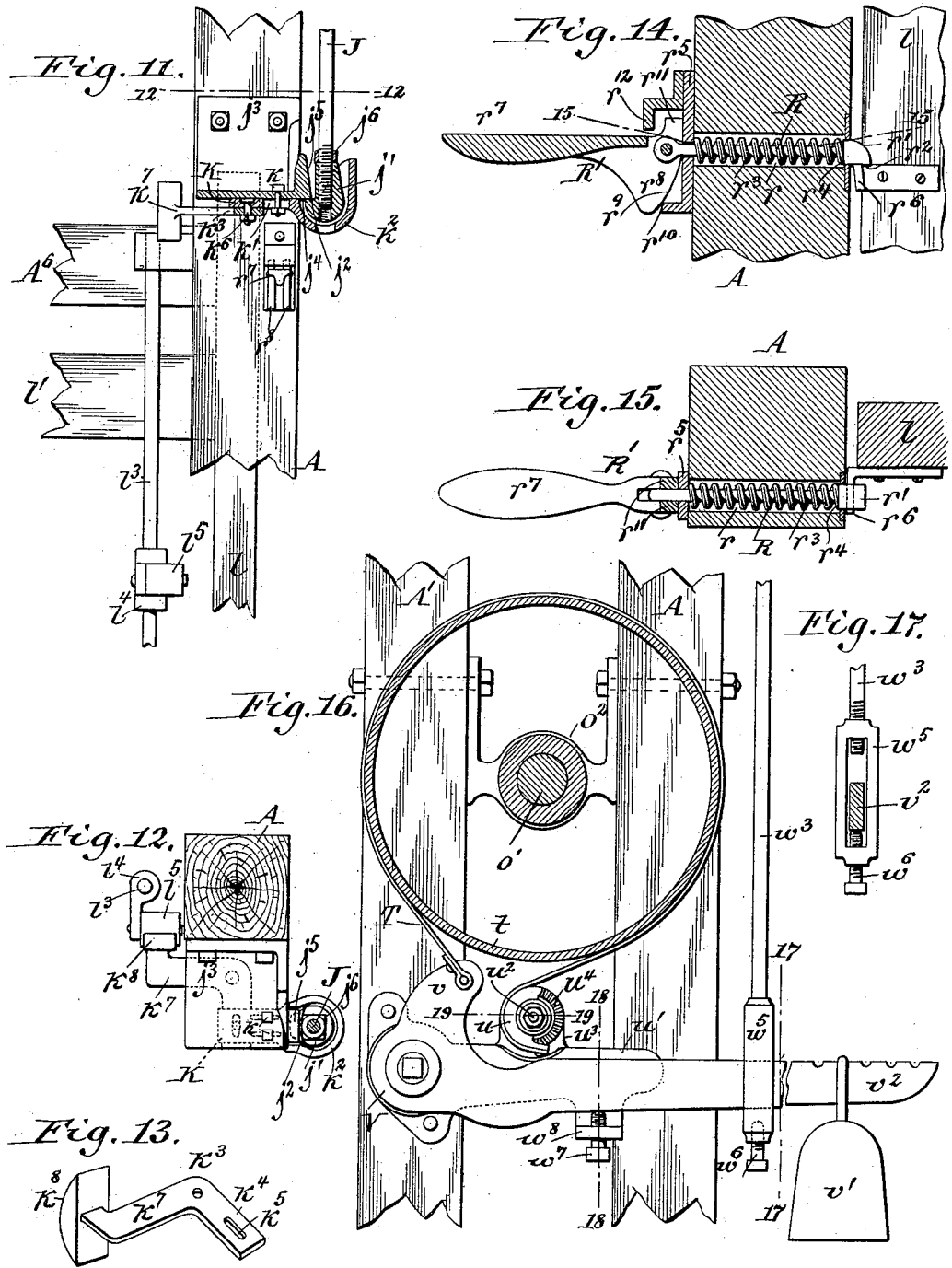

No. 611,261. Patented Sept. 27, 1898.
C. A. LANPHERE.
FLOUR PACKER.
(Application filed Apr. 8, 1897.)
(No Model.) 5 Sheets—Sheet 5.
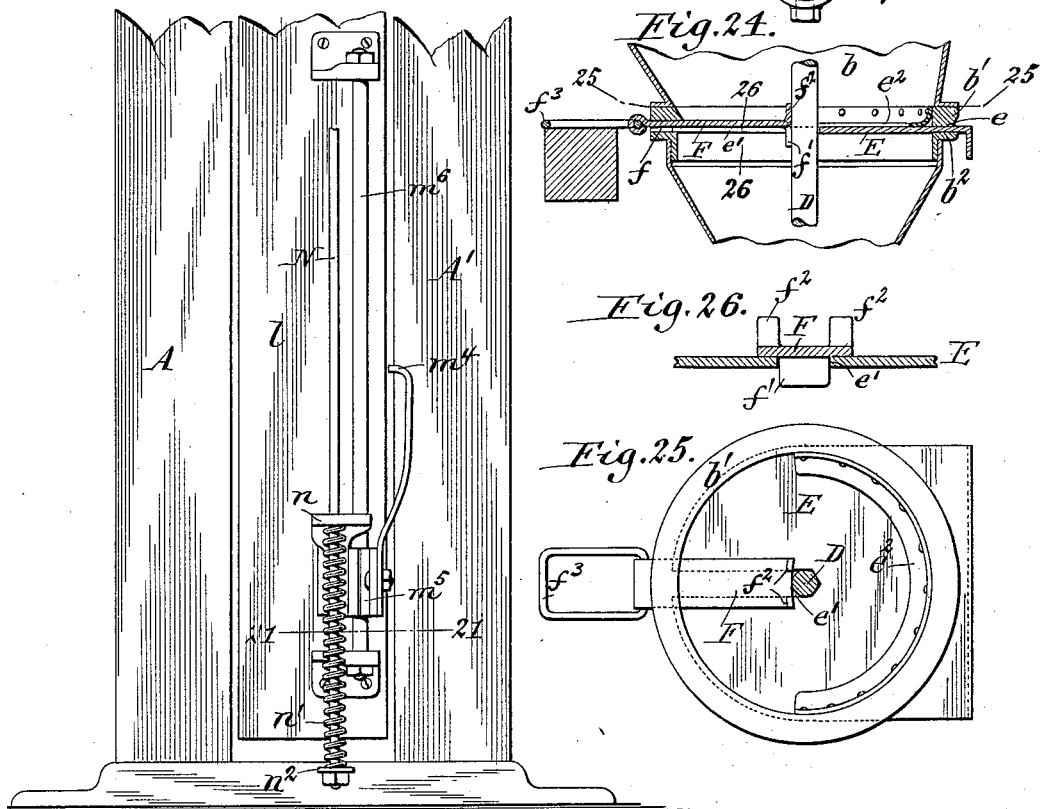
WITNESSES:
Chas. F. Burkhardt
Henry L. Deck.
C. A. Lanphere, INVENTOR.
By Wilhelm & Bonner,
ATTORNEYS.

UNITED STATES PATENT OFFICE.

CHAUNCEY A. LANPHERE, OF SILVER CREEK, NEW YORK, ASSIGNOR TO THE INVINCIBLE GRAIN CLEANER COMPANY, OF SAME PLACE.

FLOUR-PACKER.

SPECIFICATION forming part of Letters Patent No. 611,261, dated September 27, 1898.

Application filed April 8, 1897. Serial No. 631,231. (No model.)

*To all whom it may concern:*

Be it known that I, CHAUNCEY A. LANPHERE, a citizen of the United States, residing at Silver Creek, in the county of Chautauqua and State of New York, have invented new and useful Improvements in Flour-Packers, of which the following is a specification.

This invention relates to a flour-packer in which the package is supported on a vertically-movable platform and in which the flour is delivered into the package by a tube containing a rotary feeding-auger.

The object of my invention is to improve the construction of the means for cutting off the flour in the feed-hopper when changing tubes, to improve the end-thrust bearing of the auger-shaft, to improve the construction of the means for coupling the driving and feed mechanism, to automatically apply and release the brake mechanism, and to simplify and improve the machine in other respects.

Figure 1:
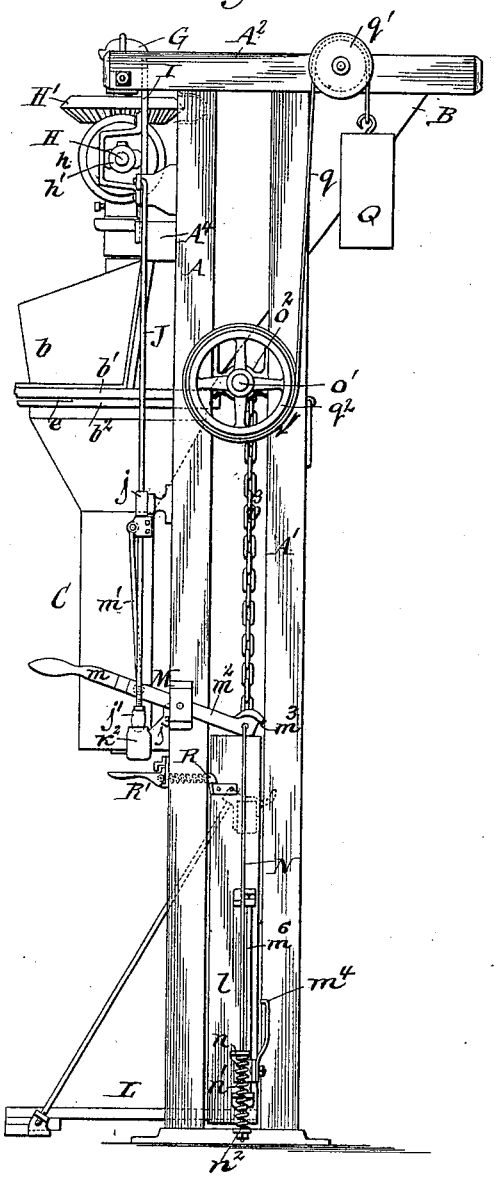
Figure 2:
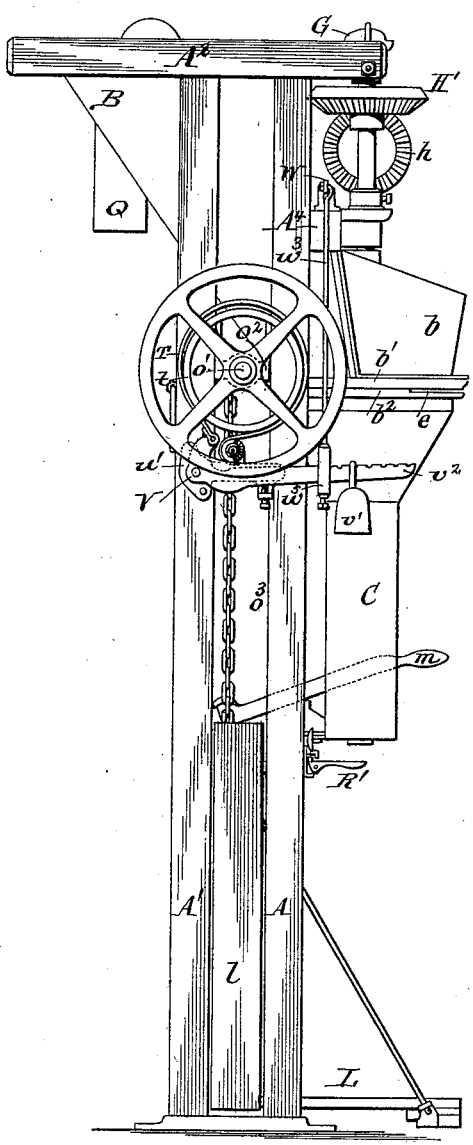
Figure 7:
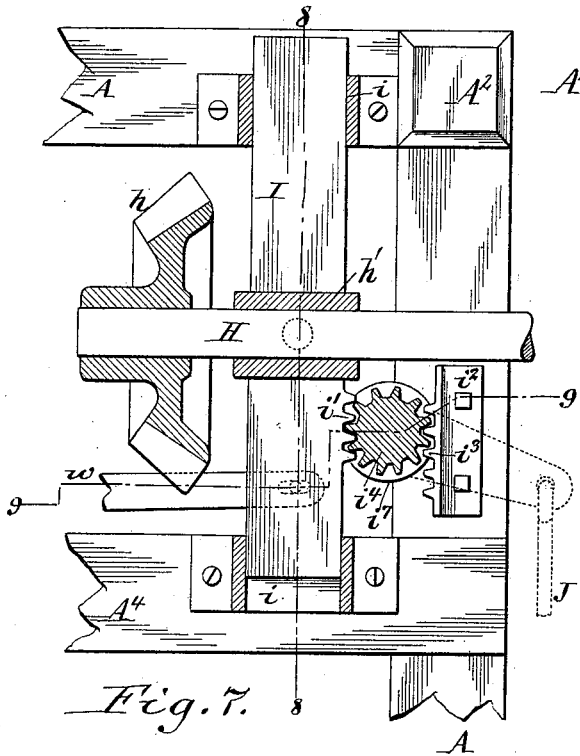
Figure 8:
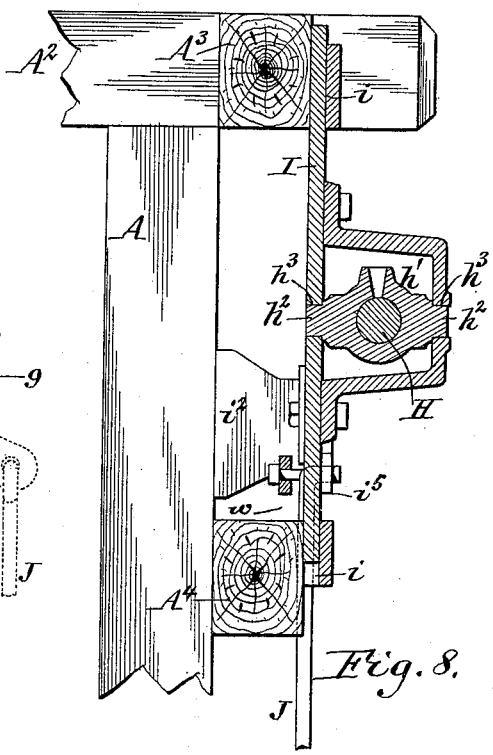
Figure 9:
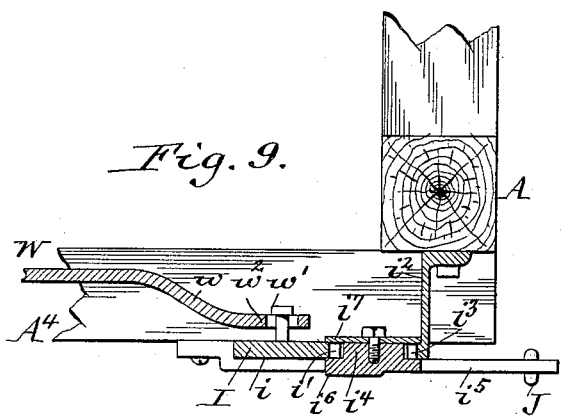
Figure 10:
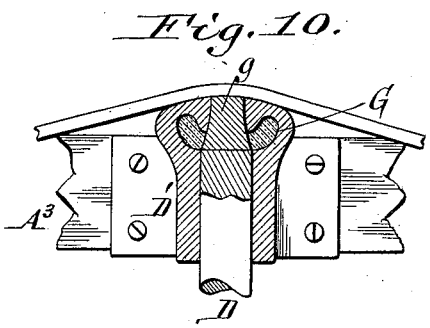

In the accompanying drawings, consisting of five sheets, Figures 1 and 2 are side elevations of my improved flour-packer viewed from the right and left hand side, respectively. Fig. 3 is a front elevation thereof. Fig. 4 is a vertical section through the center of the machine. Fig. 5 is a front elevation of the stop which limits the upward movement of the platform. Fig. 6 is a horizontal section, on an enlarged scale, in line 6 6, Fig. 5. Fig. 7 is a fragmentary vertical section, on an enlarged scale, of the coupling mechanism of the driving-gear. Fig. 8 is a vertical section in line 8 8, Fig. 7. Fig. 9 is a horizontal section in line 9 9, Fig. 7. Fig. 10 is a vertical section, on an enlarged scale, of the upper bearing of the auger-shaft taken in line 10 10, Fig. 4. Fig. 11 is a fragmentary vertical section, on an enlarged scale, of the automatic mechanism which holds the driving-gear in its coupled position and releases the same. Fig. 12 is a horizontal section in line 12 12, Fig. 11. Fig. 13 is a perspective view of the releasing-lever. Fig. 14 is a vertical section, on an enlarged scale, of the catch whereby the platform is held in its depressed position. Fig. 15 is a horizontal section in line 15 15, Fig. 14. Fig. 16 is a vertical section, on an enlarged scale, of the brake mechanism, taken in line 16 16, Fig. 3. Figs. 17 and 18 are vertical sections in lines 17 17 and 18 18, Fig. 16. Fig. 19 is a horizontal section in line 19 19, Fig. 16. Fig. 20 is a side elevation, on an enlarged scale, of the lower right-hand portion of the main frame, platform, and connecting parts. Fig. 21 is a horizontal section, on an enlarged scale, in line 21 21, Fig. 20, looking upward. Fig. 22 is a longitudinal section of the equalizing-bar and connecting parts, on an enlarged scale. Fig. 23 is a cross-section, on an enlarged scale, in line 23 23, Fig. 22. Fig. 24 is a fragmentary vertical section, on an enlarged scale, of the hopper and its cut-off mechanism. Fig. 25 is a horizontal section in line 25 25, Fig. 24. Fig. 26 is a fragmentary vertical section, on an enlarged scale, in line 26 26, Fig. 24. Fig. 27 is a perspective view of the rear cut-off or slide in the feed-hopper.

Like letters of reference refer to like parts in the several figures.

The main frame of the machine consists, essentially, of two pairs of posts A A', a head-block $A^2$, connecting the upper ends of each pair of posts, an upper cross-piece $A^3$, connecting the front ends of the head-blocks, an intermediate cross-piece $A^4$, arranged below the upper cross-piece and connecting the front posts of both pairs, intermediate cross-piece $A^5$, connecting the central portions of the rear posts of both pairs, and two lower cross-pieces $A^6$ $A^7$, connecting the lower portions of the rear posts.

B represents the feed-hopper, secured to the upper portion of the frame and provided at its lower end with a forwardly-projecting hood $b$.

$b'$ is an upper annular frame or ring secured to the lower open end of the hood and resting on a lower annular frame or ring $b^2$, which is connected with the front posts and rear intermediate cross-bar of the frame.

C represents the packing-tube, which is removably connected at its upper end to the lower supporting-frame $b^2$, and D is the vertical auger or feed-shaft, arranged with its lower portion in the packing-tube and provided with a feed-screw $d$, while its upper portion passes through the top of the hood and is journaled in bearings $D'$ $D^2$, secured, respectively, to the upper and intermediate cross-pieces $A^3$ $A^4$.

E F, Figs. 24 to 27, represent the front and rear horizontal slide-sections of the cut-off or valve whereby the lower end of the hood is closed when it is desired to change the packing-tube for one of smaller or larger diameter. The front slide-section is inserted through a slot $e$, which is formed between the front portions of the upper and lower supporting-frames $b'$ $b^2$, and is provided on its inner portion with a slot $e'$ to permit the front section to straddle the feed-shaft and close the greater portion of the opening in the lower end of the hood.

$e^2$ represents a curved strip, curtain, or shutter, of rubber, leather, canvas, or other flexible material, which is adapted to prevent the escape of flour through the slot $e$ when the front slide-section is withdrawn. This strip is secured with its upper edge to the inner side of the upper supporting-frame $b'$ and laps with its lower portion over the inner end of the slot $e$ when the front slide-section is withdrawn, thereby effectually preventing the escape of flour when the machine is in use. Upon shoving the front slide-section through the slot $e$ and across the outlet of the hood the shutter-strip is deflected upwardly, and when the slide-section is withdrawn the shutter-strip springs back or drops down over the slot. The shutter-strip thus automatically opens and closes the slot $e$ without requiring the attention of the operator for this purpose.

The rear slide-section F is inserted through a slot $f$, which is formed between the rear portions of the upper and lower supporting-frames $b'$ $b^2$, and laps with its longitudinal edges over those portions of the front slide on opposite sides of its slot $e'$, so that when the rear slide is shoved inwardly until it strikes the feed-shaft the slot $e'$ is closed and the outlet of the hopper is entirely closed. The inner end of the rear slide-section is provided with a central downwardly-bent ear or lip $f'$, which fits into the slot $e'$ of the front slide-section and prevents lateral displacement of the rear section on the front section by reason of the lip $f'$ engaging with the edges of the slot $e'$. The inner end of the rear slide-section is also provided on opposite sides of the central depending lip with two upwardly-projecting lips or ears $f^2$, which, together with the depending lip, are adapted to engage with the inner sides of the supporting-frames $b'$ $b^2$ and serve as stops to prevent the entire withdrawal of the rear slide-section, thereby preventing the same from becoming displaced or lost. In order to permit of conveniently manipulating the rear slide-section, the latter is provided with a handle $f^3$, having the form of a wire loop, which is pivoted to the outer end of the rear slide-section. When the rear slide-section has been shoved in to its fullest extent, its handle rests on the intermediate cross-bar of the rear frame-post, as represented in Fig. 24, and when the rear slide-section has been withdrawn the handle can be turned so as to hang downwardly in rear of the cross-piece $A^5$, as represented in Fig. 4, thereby preventing the same from being bent or broken.

G, Figs. 3, 4, and 10, represents a lubricating chamber or cavity formed on the bearing $D'$ around and above the upper end of the feed-shaft and provided on its top with an abutment against which the upper end of the feed-shaft bears and exerts an upward thrust. The lubricating-chamber is preferably cast integrally with the upper bearing $D'$, and the abutment is preferably formed by an upwardly-tapering block $g$, of chilled cast-iron or other suitable material, which is seated in a correspondingly-shaped socket formed in the top of the lubricating-chamber. The latter is provided on one side with an opening $g'$, Fig. 4, through which cotton-waste and oil are introduced into the lubricating-chamber for lubricating the upper bearing and the abutment of the feed-shaft. This construction of bearing for taking up the end thrust of the feed-shaft is exceedingly simple and durable and enables the same to be thoroughly lubricated.

H, Figs. 3, 7, and 8, represents the continuously-rotating horizontal driving-shaft provided at its inner end with a bevel gear-wheel $h$, which is adapted to be engaged with or disengaged from a bevel gear-wheel $H'$ on the feed-shaft by raising or lowering the driving-shaft, thereby operating the packing-auger or stopping the same in a well-known manner. The driving-shaft is journaled with its inner end in a swivel-bearing $h'$, having horizontal trunnions $h^2$ on opposite sides which are journaled in bearings $h^3$ $h^3$, arranged on a vertically-movable slide I. This slide is guided with its upper and lower ends in guides or ways $i$, arranged on the cross-pieces $A^3$ $A^4$, and is provided on one side with a vertical row of teeth $i'$, forming a gear-rack.

$i^2$ is a bracket arranged on one of the front posts and provided at its front end with a vertical row of teeth $i^3$, forming a gear-rack which faces the gear-rack on the bearing-slide.

$i^4$, Figs. 3 and 9, is a floating gear-wheel having the teeth on its opposite sides meshing with the teeth of the slide and bracket, respectively, so that upon turning the gear-wheel the latter will roll on the bracket and at the same time move the slide, the effective movement of the slide being twice that of the vertical movement of the gear-wheel. The gear-wheel is provided on its front side with an outwardly-projecting rock-arm $i^5$, whereby the same is turned. The gear-wheel is confined on the gear-racks by an annular flange $i^6$, formed on the front side of the gear-wheel and engaging with the front sides of the gear-racks, and a plate $i^7$, secured to the rear side of the gear-wheel and engaging with the rear sides of the gear-racks, as represented in Figs. 3 and 9.

J represents a vertical actuating or shifting rod connected at its upper end with the arm of the floating gear-wheel and guided with its middle portion in a guide $j$, which is secured to one of the front posts. The lower end of the actuating-rod is provided with a spherical or knuckle-shaped catch $j'$, Figs. 11 and 12, which is provided on its inner side with an upwardly-facing shoulder $j^2$.

$j^3$ is a forwardly-projecting bracket arranged on the front post adjacent to the actuating-rod and provided on its outer side with a stop having a downwardly-facing shoulder $j^4$ and above the latter with an inclined face $j^5$. The relative position of the catch $j'$ and the incline $j^5$ is such that when the rod is pulled downwardly the catch engages with the incline during the last portion of its downward movement and is deflected laterally, together with the rod, until the shoulder of the catch passes below the shoulder $j^4$ of the bracket, when the resilience of the rod again carries the catch inwardly, so that its shoulder engages with the shoulder of the bracket, thereby raising the driving-shaft and holding its gear-wheel in engagement with that of the feed-shaft.

The catch $j'$ is made adjustable on the shifting-rod by providing the lower end of the latter with a screw-thread which enters a threaded opening in the catch, and the latter is clamped in its adjusted position by a jam-nut $j^6$.

K represents a horizontal releasing-slide whereby the actuating-rod is released for permitting the driving-shaft to drop and disengage its gear-wheel from that of the feed-shaft. This slide is arranged on the under side of the bracket $j^3$ and movably connected therewith, so as to be capable of sliding laterally and disengaging the catch from the bracket. The slide is preferably connected with the bracket by means of bolts $k$, secured to the bracket and engaging with slots $k'$ in the slide. The outer end of the slide is provided with a cup or socket $k^2$, which receives the catch $j'$ and serves as a guide for the latter.

$k^3$ is a horizontally-swinging elbow-lever pivoted to the under side of the bracket $j^3$ and provided on its forwardly-projecting arm $k^4$ with a slot $k^5$, which receives a connecting-pin $k^6$ on the releasing-slide, and on its inwardly-projecting arm $k^7$ with a curved face $k^8$. Upon turning the rock-lever so that its inner arm swings outwardly its outer arm shifts the releasing-slide and disengages the catch from the bracket.

L represents the vertically-movable platform upon which the package to be filled is placed and which is provided with two side pieces $l\ l$, guided between the posts and upper and lower cross-bars $l'\ l^2$, connecting the side pieces.

$l^3$ is an upright supporting-rod secured with its ends to the platform and one of the side pieces. Upon this rod is mounted a vertically-adjustable sleeve $l^4$, carrying a roller or tappet $l^5$, which is adapted to engage with the inner arm of the elbow-lever during its downward movement with the platform and shift the slide for releasing the catch $j'$, Figs. 3, 11, and 12. By raising or lowering the tappet $l^5$ on the rod $l^3$ the time at which the driving-gear is uncoupled from the auger can be set according to the capacity of the package or the quantity which it is desired to place in the same.

M represents a rock-lever whereby the rod J is pulled down to set the feed-auger in motion and which is pivoted to the front post adjacent to the actuating-rod, Figs. 1, 2, 3, and 4. The front arm $m$ of this rock-lever is connected with the actuating-rod by a link $m'$, and its rear arm $m^2$ is provided with a downwardly-facing shoulder $m^3$.

$m^4$ is a tappet which rises and falls with the platform and which is adapted to engage with the shoulder on the rear arm of the rock-lever during the last portion of the upward movement of the platform and lift the rear arm until the front arm has pulled the rod J down sufficiently to couple the driving-gear with the feed-auger and engage the catch of the actuating-rod with the shoulder of the bracket. This tappet is secured to a clamp $m^5$, which is capable of vertical adjustment on a vertical rod $m^6$, secured to the outer side of one of the platform side pieces. By raising or lowering the tappet $m^4$ on the rod $m^6$ the feed-auger can be started at different points in the upward movement of the platform, this being determined by the size and the nature of the package.

Ordinarily the weight of the driving-shaft and connecting parts is sufficient to cause the same to drop by gravity and disengage its gear-wheel from that of the feed-shaft when the catch is released. In order to cause the driving-shaft to move downwardly with certainty, if from any cause the parts do not drop freely, which is liable to happen when the belt of the driving-shaft pulls in an opposite direction, the following mechanism is provided:

N is a vertical pull-rod connected with its upper end to the rear arm of the rock-lever and passing with the lower portion through an eye or tappet $n$ on the clamp $m^5$.

$n'$ is a spring which surrounds the pull-rod between the eye $n$ and a screw-nut $n^2$ on the lower end of the pull-rod. The position of this spring is such that the eye $n$ bears upon the upper end of the spring before the tappet $l^5$ releases the catch of the actuating-rod J. If the uncoupling of the driving-gear does not take place by gravity when the tappet releases the actuating-rod, the tension of the spring $n'$, which has been so produced during the downward movement of the platform, pulls down the rear arm of the rock-lever and the driving-shaft connected therewith. As the pull-rod descends the spring $n'$ again expands, but is again compressed by the eye $n$ during the last portion of the downward movement of the platform, which compression serves to aid the subsequent upward movement of the platform during the initial portion thereof.

O O represent the hoisting drums or rollers, whereby the platform is raised and which are mounted on a horizontal shaft $o'$, journaled transversely in bearings $o^2$, secured between the upper portions of the posts.

$o^3$ are the hoisting-chains, which are wound with their upper ends around the drums and which are connected at their lower ends with the platform-frame by an equalizing lever or yoke P, Fig. 22. This yoke consists of a bar which is bent so as to form two lower arms $p$, connected by a central depressed seat $p'$, and two upper arms $p^2$, which are separated from each other at their inner ends by a space and connected at their outer ends by raised seats $p^3$ with the outer ends of the lower arms. The central seat of the yoke engages with an eye $p^4$, which is formed on the upper end of a tie-rod $p^5$, which is connected with the platform-frame, and the end seats $p^3$ engage with the links at the lower ends of the hoisting-chains. The inner ends of the upper arms are connected for the purpose of strengthening the yoke by two coupling or clamping blocks $p^6$, which bridge the space between the inner ends of the upper arms and which are clamped against opposite sides of these arms by a transverse bolt $p^7$, connecting the clamping-blocks. If it should be necessary to detach the yoke from the tie-rod or from the chains to repair any of these parts, this can be readily done by removing the clamping-blocks $p^6$, which permits the chains to be detached from the yoke and the latter to be detached from the eye of the tie-rod.

Q represents the platform-elevating weight, and $q$ the lifting chain or band which passes around an idle-wheel $q'$ on the frame and which is connected at one end with the weight and wound with its opposite end around a drum or pulley $q^2$ on one end of the drum-shaft, as shown in Fig. 1. As the platform descends with the filled package owing to the weight of the latter and the action of the auger the drum-shaft is turned in the direction of the arrow, Fig. 1, by the unwinding of the chains from the drums O, whereby the band is wound on the pulley $q^2$ and the weight Q is raised. When the platform is unloaded and free to be moved upwardly, the preponderance of the weight Q causes the latter to raise the platform by unwinding the band from the pulley $q^2$ and winding the chains on the drum in a well-known manner.

R represents a spring bolt or catch whereby the platform is held in its lowermost position against the pull of the weight Q in order to enable the filled package to be removed from the platform and an empty package to be placed thereon. This bolt slides in a horizontal opening $r$ in one of the front posts, Figs. 1, 2, 14, and 15, and is provided at its rear end beyond the post with an inclined upper side $r'$ and an abrupt lower side or shoulder $r^2$. The bolt is yieldingly held in a projected position by a spring $r^3$, surrounding the bolt and bearing with its ends against a shoulder $r^4$ on the bolt and a plate $r^5$, which forms a shoulder at the front end of said opening.

$r^6$ is a lug or stop arranged on the side piece of the platform-frame adjacent to the spring-bolt and adapted to engage with the latter. During the last portion of the downward movement of the platform its lug engages with the inclined upper side of the spring-bolt and retracts the same, and at the end of the downward movement of the platform the lug has passed below the spring-bolt, which permits the latter to be again projected into the path of the lug, thereby presenting its abrupt side to the stop of the platform and preventing the latter from rising until the spring-bolt has been withdrawn. The spring-bolt is retracted by a releasing-lever R', which is pivoted thereto in front of the plate $r^5$ and which consists of a forwardly-projecting thumb-piece or handle-arm $r^7$ and two downwardly-projecting arms $r^8$, having curved faces $r^9$ on their rear sides which bear against an abutment $r^{10}$ on the lower portion of the supporting-plate $r^5$. Upon pressing the handle downwardly the lever turns with its depending lugs on the abutment as a fulcrum and withdraws the bolt. In order to limit the downward movement of the releasing-lever and prevent undue straining of the spring of the bolt, the lever is provided adjacent to its pivot with two upwardly-projecting lugs $r^{11}$, which are adapted to strike an overhanging stop $r^{12}$, secured to the supporting-plate $r^5$.

S, Figs. 3, 4, 5, and 6, represents a rearwardly-projecting lip or lug arranged on the upper cross-piece of the platform-frame and adapted to engage with a vertically-adjustable stop S' on the main frame for limiting the upward movement of the platform. This stop is preferably U-shaped and has its lower curved portion $s$ arranged in the path of the lug S on the platform, so as to serve as an abutment therefor, while its arms $s'$ $s'$ are clamped between a fixed plate $s^2$, which is secured to the rear intermediate cross-bar $A^5$, and a detachable plate $s^3$, which is connected with the fixed plate by a transverse bolt $s^4$. By means of this vertically-adjustable stop the upward movement of the platform may be positively arrested to suit the kind of material which is being packed and the kind and size of package.

The descent of the platform during the operation of filling a package is retarded by a brake-band T, which surrounds a brake-wheel $t$, mounted on one end of the drum-shaft. The fixed end of the brake-band is secured by a rivet or otherwise to the curved face of a segment-shaped carrier $u$, Figs. 16 and 19, which is secured to the side of a supporting-plate $u'$ by a horizontal bolt $u^2$. This plate is provided with a raised lug $u^3$, which has a serrated circular face $w^4$, concentric with said bolt. The latter has a square neck by which it is held against turning in the supporting-plate. The rear edge of the band-carrier $u$ is serrated to interlock with the serrated face of the supporting-plate. Upon loosening the bolt the carrier can be turned about the same as may be necessary to adjust the fixed end of the brake-band.

The opposite end of the brake-band is connected with the upwardly-projecting short arm $v$ of the brake-lever V, which is pivoted on the supporting-plate.

$v'$ is a weight which is hung on the forwardly-projecting long arm $v^2$ of the brake-lever and whereby the lever is turned to tighten the band on the brake-wheel in the usual manner.

In order to permit the platform to drop quickly after the package is filled, the brake mechanism is released at this time by the following mechanism:

W represents a horizontal rock-lever which is pivoted transversely to the front intermediate cross-piece $A^4$ and has its inner arm $w$ connected with the bearing-slide I by a pin $w'$, arranged on the rear side of the latter and engaging with a slot $w^2$ in said arm.

$w^3$ is a vertical rod connected at its upper end with the outer arm $w^4$ of the rock-lever and provided at its lower end with a loop $w^5$, through which the front arm of the brake-lever passes loosely.

$w^6$ is a vertical bearing or adjusting screw arranged in the lower portion of the loop and adapted to bear against the under side of the brake-lever. When the slide I drops for uncoupling the driving gearing and stopping the feeding action, the inner arm of the rock-lever W is depressed and its outer arm is raised, thereby causing the screw $w^6$ to engage with the under side of the front brake-lever arm and lift the same, whereby the brake-band is released from the brake-wheel and the platform is permitted to descend without restraint. When the bearing-slide I is again raised for throwing the driving mechanism into gear, the brake-lever is allowed to resume its normal position and apply the brake-band to the brake-wheel. By this means the operation of coupling the driving mechanism with the feeding mechanism and applying the brake mechanism and the operation of uncoupling the driving mechanism and feed mechanism and releasing the brake mechanism are effected automatically and in unison. The adjustment of the bearing-screw $w^6$ is such that it is out of engagement with the brake-lever when the brake is applied and the driving-gearing is coupled. This causes the bearing-slide to effect a portion of its downward movement and acquire a momentum before the screw $w^6$ engages with the brake-lever and releases the brake, thereby rendering the operation of uncoupling the driving-gear easy and certain, and it also causes the brake to be applied an instant before the coupling of the driving mechanism is completed and before the platform has reached its highest position, thereby checking the speed of the platform during the last portion of its upward movement.

It has been found in practice that when the power of the brake is regulated solely by shifting the weight $v'$ toward or from the fulcrum of the brake-lever the grip of the brake-band on the brake-wheel, produced by the dropping of the weight, is variable, which results in a variation in the quantity of material which is fed into the packages. In order to avoid this difficulty, the downward or tightening movement of the brake-lever is regulated by an adjustable stop-screw $w^7$, Figs. 16 and 18, which is arranged below the front arm of the brake-lever and supported in a laterally-projecting lug $w^8$ on the supporting-plate $u'$. When the brake-lever is released, it drops until it strikes the stop-screw $w^7$, and the excessive tightening of the brake-band is prevented.

The operation, briefly, of my improved flour-packer is as follows: When the parts are in the position shown in Figs. 1, 2, 3, and 4, the platform is held down in the lowest position by the catch R, the driving-gear is uncoupled, the brake is released, and the elevating-weight Q is raised. The operator now places an empty package on the platform and withdraws the catch R, thereby releasing the platform and permitting the weight Q to raise the same. During the last portion of the upward movement of the platform its tappet $m^4$ engages with the rear end of the lock-lever M and turns the same, whereby the driving-gear is coupled for starting the feeding of flour into the package and the brake is applied to check the descent of the platform. When the latter has descended sufficiently to fill the package, the tappet $l^5$ engages with the elbow-lever $k^3$ and releases the actuating-rod J, thereby permitting the driving-gear to be uncoupled for stopping the feeding action of the auger and also releasing the brake, thereby permitting the platform to descend quickly and unrestrained to its lowest position, where it is caught by the catch R and held to permit the filled package to be removed and replaced by an empty package. The operation of the flour-packer is automatic from the time the empty package begins its upward movement to the time when the filled package is lowered by the platform, and the only operation required of the operator is to release the catch R.

I claim as my invention—

1. In a flour-packer, the combination with the feed-hopper provided on its front and rear sides with slots and a feed-shaft, of a front slide arranged in the front slot and provided with a slot which receives the feed-shaft, and a rear slide arranged in the rear slot and resting with its side portions on the front slide on opposite sides of its slot, and having at its inner end a lip which engages in the slot of the front slide, substantially as set forth.

2. In a flour-packer, the combination with the feed-shaft and the feed-hopper provided on its front and rear sides with slots, of a front slide arranged in the front slot and provided with a slot which receives the feed-shaft, and a rear slide covering the slot of the front slide and having at its inner end a lower stop which engages in the slot of the front slide and upper stops which are adapted to engage against the inner side of the feed-hopper, and a handle pivoted to the outer end of said rear slide, substantially as set forth.

3. In a flour-packer, the combination with the vertical feed-shaft, the horizontal driving-shaft, and the gear-wheels mounted on said shafts and adapted to be engaged and disengaged, of a vertical slide carrying the driving-shaft and provided with a gear-rack, a stationary bracket provided with a gear-rack, a gear-wheel having its opposite sides meshing with said gear-racks, and means for actuating said gear-wheel, substantially as set forth.

4. In a flour-packer, the combination with the vertical feed-shaft, the horizontal driving-shaft, and the gear-wheels mounted on said shafts and adapted to be engaged and disengaged, of a vertical slide carrying the driving-shaft and provided with a gear-rack, a stationary bracket provided with a gear-rack, a gear-wheel having its opposite sides meshing with said gear-racks and having on one side an annular flange engaging against one side of the gear-racks and on the opposite side a plate engaging against the opposite sides of the gear-racks, and means for actuating said gear-wheel, substantially as set forth.

5. In a flour-packer, the combination with the feed mechanism and the driving mechanism adapted to be coupled with or uncoupled from the feed mechanism, of a shifting-rod connected with the driving mechanism and provided at its lower end with a catch having a rounded head, a fixed stop adapted to be engaged by said catch, and a releasing-slide adapted to disengage the catch from said stop and provided with a cup into which said head enters and whereby the catch is directed toward said stop, substantially as set forth.

6. In a flour-packer, the combination with the feed mechanism and the driving mechanism adapted to be coupled with or uncoupled from the feed mechanism, of an upright shifting-rod connected with the driving mechanism and provided at its lower end with a catch, a stop adapted to be engaged by said catch, a releasing-slide adapted to disengage the catch from said stop, and an elbow-lever whereby said slide is operated, substantially as set forth.

7. In a flour-packer, the combination with the vertically-movable platform, the feed mechanism, and the driving mechanism adapted to be coupled with or uncoupled from the feed mechanism, of a shifting-rod connected with the driving mechanism and provided at its lower end with a catch, a stationary bracket provided with a stop adapted to be engaged by said catch, a releasing-slide guided on said bracket and adapted to disengage said catch from the stop, an elbow-lever pivoted on said bracket and having one of its arms connected with said slide, and a tappet on the platform adapted to engage with the other arm of the elbow-lever, substantially as set forth.

8. In a flour-packer, the combination with the vertically-movable platform and the feed mechanism, of a driving mechanism adapted to be engaged with or disengaged from the feed mechanism, a shifting-rod connected with the driving mechanism and provided with a catch, a stop adapted to be engaged by said catch, a rock-lever connected with said shifting-rod for moving the same up or down, and a tappet on the platform adapted to engage the rock-lever, as the platform approaches the upward limit of its movement, and move the rock-lever and shifting-rod to throw the driving mechanism into gear, substantially as set forth.

9. The combination with the feed-shaft, the vertically-movable driving-shaft, the platform, and the shifting-rod connected with the driving-shaft and provided with a catch mechanism which is released for throwing the driving-shaft out of gear, of a pull-rod which is actuated by a tappet on the platform when said catch mechanism has been released as the platform approaches the limit of its downward movement and whereby the driving-shaft is positively moved out of gear after its shifting-rod has been released, substantially as set forth.

10. In a flour-packer, the combination with the vertically-movable platform and the feed mechanism, of a driving mechanism adapted to be engaged with or disengaged from the feed mechanism, a pull-rod connected with the driving mechanism, an eye or tappet arranged on the platform and moving lengthwise on said rod, and a spring interposed between said eye or tappet and a shoulder or rod, substantially as set forth.

11. In a flour-packer, the combination with the vertically-movable platform, the feed-shaft and the driving-shaft adapted to be engaged with or disengaged from the feed-shaft, of a shifting-rod, a rock-lever having one of its arms connected therewith, and a pull-rod connected with the other arm of the rock-lever and adapted to be operated by an eye or tappet on the platform, substantially as set forth.

12. In a flour-packer, the combination with the platform and the hoisting-chains, of a yoke consisting of two lower arms connected with the platform, two upper arms extending inwardly from the outer ends of the lower arms and connected with said chains, and a coupling connecting the inner ends of the upper arms, substantially as set forth.

13. In a flour-packer, the combination with the platform provided with an eye, and the hoisting-chains, of a yoke consisting of two lower arms connected by a seat which receives the eye of the platform, two upper arms connected at their outer end with the outer ends of the lower arms by seats which receive said chains, and coupling-blocks which are clamped by a bolt to the inner ends of the upper arms, substantially as set forth.

14. In a flour-packer, the combination with the brake-drum, the brake-band and the weighted brake-lever, of an adjustable stop which limits the braking movement of the lever and whereby the contact of the brake-band with the drum can be regulated independently of the pressure which is applied to the brake-lever, substantially as set forth.

15. In a flour-packer, the combination with the platform and its brake mechanism, of intermediate mechanism whereby the brake mechanism is automatically released after the package has been filled, for effecting the subsequent free downward movement of the platform, and again applied automatically during the last portion of the upward movement of the platform, substantially as set forth.

16. In a flour-packer, the combination with the platform and its brake mechanism, of intermediate mechanism whereby the brake mechanism is automatically released after the package has been filled, for effecting the subsequent free downward movement of the platform, and again applied automatically during the last portion of the upward movement of the platform, and a locking-bolt whereby the platform is locked down when it has reached its lowest position, substantially as set forth.

17. In a flour-packer, the combination with the movable platform and the feed mechanism, of a driving mechanism adapted to be engaged with or disengaged from the feed mechanism, a brake mechanism, connecting mechanism whereby the driving mechanism and the brake mechanism are simultaneously thrown out of action from the platform when the package has been filled, thereby allowing the platform to descend freely to its lowest position after the filling has been completed, and an automatic catch whereby the platform is locked in its lowest position and held against the upward pull of the platform-weights when the package has been removed, substantially as set forth.

18. In a flour-packer, the combination with the movable platform, the feed mechanism and the driving mechanism arranged in a movable support adapted to be engaged with or disengaged from the feed mechanism, of a brake mechanism arranged on one side of the platform, an upright shifting-bar arranged on the other side of the platform, mechanism connecting the shifting-bar with the movable support of the driving mechanism, and mechanism connecting said movable support with the brake mechanism, substantially as set forth.

19. In a flour-packer, the combination with the movable platform and the feed mechanism, of a driving mechanism adapted to be coupled with or uncoupled from the feed mechanism, a brake mechanism connected with the platform, and a slack connection between the driving mechanism and brake mechanism, whereby the driving mechanism during the initial portion of its uncoupling movement travels independent of the brake mechanism but the brake mechanism is compelled to move with the driving mechanism and release the platform during the last portion of the uncoupling movement of the driving mechanism, substantially as set forth.

20. In a flour-packer, the combination with the movable platform and the feed mechanism, of a driving mechanism connected with the feed mechanism, a brake mechanism connected with the platform and provided with a brake-lever, a rock-lever connected with one arm to the driving mechanism, a rod connected with the other arm of the rock-lever and having a loop which receives said brake-lever, and an adjusting-screw arranged in said loop and adapted to engage with said brake-lever, substantially as set forth.

Witness my hand this 17th day of March, 1897.

CHAUNCEY A. LANPHERE.

Witnesses:
  THEO. L. POPP,
  ELLA R. DEAN.